(12) United States Patent
Holey et al.

(10) Patent No.: US 8,844,739 B2
(45) Date of Patent: Sep. 30, 2014

(54) FOOD STORAGE CONTAINER

(76) Inventors: Susan M. Holey, Greenwich, CT (US); James Farrell, Greenwich, CT (US)

(*) Notice: Subject to any disclaimer, the term of this patent is extended or adjusted under 35 U.S.C. 154(b) by 385 days.

(21) Appl. No.: 13/335,417

(22) Filed: Dec. 22, 2011

(65) Prior Publication Data
US 2013/0161319 A1 Jun. 27, 2013

(51) Int. Cl.
B65D 6/28 (2006.01)
(52) U.S. Cl.
USPC ....... 220/4.01; 220/4.03; 220/4.16; 220/4.21; 220/4.24; 206/216; 206/223; 206/541; 206/577; 229/101; 229/103
(58) Field of Classification Search
CPC .... B65D 21/083; B65D 21/086; B65D 13/00; B65D 11/1088; B65D 11/1866; B65D 2519/00273; B65D 2519/00323; B65D 2519/00502; B65D 2519/00641; A41J 58/145; A47B 2230/0085
USPC .......... 206/216, 223, 541, 545, 577; 220/4.02–4.03, 4.16, 4.21, 4.24, 220/4.26–4.28, 3, 4.31, 23.4, 8; 229/101–101.2, 103, 107, 199, 906, 229/939, 942; 361/679.45, 679.49–679.51, 361/688, 703
See application file for complete search history.

(56) References Cited

U.S. PATENT DOCUMENTS

| 2,907,487 | A | * | 10/1959 | Harrington | 220/8 |
| 2,925,933 | A | * | 2/1960 | Watson et al. | 220/8 |
| 2,948,624 | A | * | 8/1960 | Watson et al. | 426/111 |
| 3,134,499 | A | * | 5/1964 | Johnson | 220/8 |
| 4,136,817 | A | * | 1/1979 | Perry | 229/101 |
| 4,283,427 | A | * | 8/1981 | Winters et al. | 426/107 |
| 4,476,989 | A | | 10/1984 | Larsen | |
| 4,749,097 | A | * | 6/1988 | Rosman | 220/4.21 |
| 5,014,853 | A | * | 5/1991 | Crockett | 229/103 |
| 5,016,772 | A | * | 5/1991 | Wilk | 220/8 |
| 5,060,851 | A | * | 10/1991 | Lorenz | 229/125.29 |
| 5,413,236 | A | * | 5/1995 | Kenevan | 220/4.28 |
| 5,582,312 | A | * | 12/1996 | Niles et al. | 220/4.21 |
| 5,887,741 | A | | 3/1999 | Chiang | |
| 6,386,381 | B2 | * | 5/2002 | Csiszar | 220/4.03 |
| 6,691,884 | B1 | * | 2/2004 | Dwyer | 220/4.03 |
| 2005/0109775 | A1 | * | 5/2005 | Meissen | 220/23.6 |
| 2009/0261108 | A1 | * | 10/2009 | Steinberg | 220/571 |

* cited by examiner

Primary Examiner — Mickey Yu
Assistant Examiner — Brijesh V. Patel
(74) Attorney, Agent, or Firm — Dale J. Ream

(57) ABSTRACT

A reusable food storage container includes bottom and top members, each having first and second portions. Each bottom member first portion includes a bottom wall with opposed side walls and an end wall extending between the side walls and extending upwardly from the bottom wall. Each bottom member defines an open end opposite its outside end wall and an open top. The bottom member portions are selectively coupled together using tab and channel structures. The top member portions each include a top wall having opposed end walls with an outer side wall connecting the end walls and extending downwardly from the top wall. The top member portions are selectively connected using tab and channel structures. Each top member defines an open side opposite its respective outside side wall and an open bottom. The top portion includes a circumference slightly larger than that of the bottom portion, enabling a nesting attachment.

17 Claims, 5 Drawing Sheets

US 8,844,739 B2

FOOD STORAGE CONTAINER

BACKGROUND OF THE INVENTION

This invention relates generally to storage containers and, more particularly, to a food storage container that is reusable and may be disassembled for washing and storage. The food storage container is ideal for carry-out pizza or storing pizza after removal from a traditional cardboard pizza box.

When dining out at a pizza restaurant or picking up pizza by carry-out, slices of pizza are typically brought home in a square or rectangular cardboard box. Recurring problems with this procedure include determining how to store the leftover pizza slices in the refrigerator and how to overcome grease soaking through the pizza box. Continued use of the pizza box, such as when storing pizza slices for several days, only exacerbates the problems described above.

Consumers may choose to utilize one or more plastic containers with sealable lids to store pizza slices in a refrigerator. Although assumably effective for their intended purposes, traditional plastic food storage containers introduce additional problems, such as not being configured to hold multiple slices or even an entire pizza, causing the buildup of significant condensation due to a lack of venting, and large containers not being easy to load in a dishwasher or to store in a cabinet.

Therefore, it would be desirable to have a reusable food pizza box specifically configured to store leftover or carry-out pizza. Further, it would be desirable to have a reusable food pizza box that provides ventilation to the contents while not allowing grease or moisture to leak from the container. In addition, it would be desirable to have a reusable food pizza box that may be quickly and easily assembled for use and disassembled for storage or cleaning.

SUMMARY OF THE INVENTION

A reusable food storage container according to a preferred embodiment of the present invention includes bottom and top members, each having first and second portions. Each bottom member first portion includes a bottom wall with opposed side walls and an end wall extending between the side walls and extending upwardly from the bottom wall. Each bottom member portion defines an open end opposite its respective outside end wall and an open top. The bottom member portions are selectively coupled together using a tab and channel structure. The top member portions each include a top wall having opposed end walls with an outer side wall connecting the end walls and extending downwardly from the top wall. Each top member portion defines an open interior side opposite its respective outside side wall and an open bottom. The top member portions are selectively connected using tab and channel structures. The top portion includes a circumference slightly larger than that of the bottom portion, enabling a nesting attachment.

The bottom walls of the bottom portions include an interior edge having a lip and groove structure, respectively, so as to form a moisture barrier when the bottom portions are selectively coupled together. In addition, the top member portions include at least one locking tab extending from an interior surface of the top wall that is displaced slightly from a respective top member portion end wall so as to form a slot configured to receive a portion of a respective bottom member end wall in a friction fit engagement. Accordingly, all portions are selectively and securely coupled together while still being easily disassembled for storage or cleaning.

Therefore, a general object of this invention is to provide a reusable food storage container that may be assembled and disassembled for storage and cleaning.

Another object of this invention is to provide a reusable food storage container, as aforesaid, that gently locks together multiple container portions for stability and strength.

Still another object of this invention is to provide a reusable food storage container, as aforesaid, in which the multiple container portions may be disassembled with mild pulling force.

Yet another object of this invention is to provide a reusable food storage container, as aforesaid, that is vented to diminish condensation buildup and that is sealed to eliminate leakage.

A further object of this invention is to provide a reusable food storage container, as aforesaid, that is dishwasher friendly.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is an isolated view on an enlarged scale taken from a portion of FIG. 4a;

FIG. 5b is an isolated view on an enlarged scale taken from a portion of FIG. 5a.

DESCRIPTION OF THE PREFERRED EMBODIMENT

A reusable food storage container according to a preferred embodiment of the present invention will now be described in detail with reference to FIGS. 1 to 5b of the accompanying drawings. The food storage container 10 includes a bottom member 20 that nests in a top member 60. The top member 60 and bottom member 20 each include first and second portions that may be selectively assembled or disassembled as will be described in more detail below.

Figure 3:
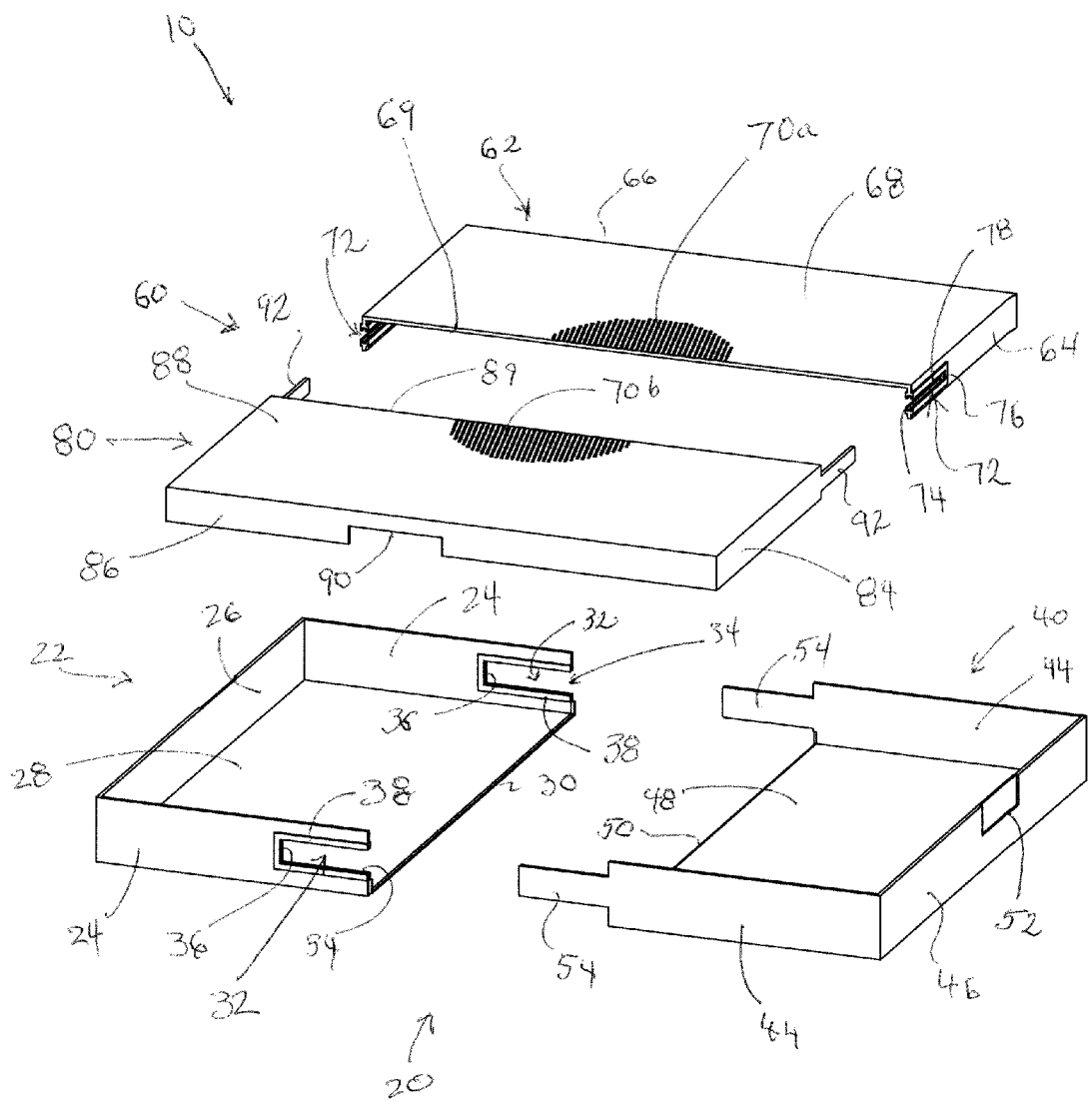
FIG. 3 is a fully exploded view of the food storage container as in FIG. 2.

The bottom member 20 includes a first portion 22 selectively coupled to a second portion 40. The first portion 22 of the bottom member may include opposed side walls 24 and an end wall 26 extending between the side walls 24 (FIG. 3). The side walls 24 and end wall 26 extend upwardly from a peripheral edge of a first portion bottom wall 28. The bottom wall 28 includes a generally planar configuration. The bottom wall 28 includes an interior edge 30 opposite the end wall 26. The end wall 26 and side walls 24 define an open top and an open interior end at the interior edge 30 opposite the end wall 26.

Similarly, the bottom wall of the second portion 40 may include opposed side walls 44 and an end wall 46 extending between the side walls 44 (FIG. 3). The side walls 44 and end wall 46 extend upwardly from a peripheral edge of a bottom wall 48 of the second portion. The bottom wall 48 includes an interior edge 50 opposite the end wall 46. The end wall 46 and side walls 44 define an open top and an open interior end at the interior edge 50 opposite the end wall 46. The side walls 24 of the first portion of the bottom member are selectively and releasably coupled to the side walls 44 of the second portion of the bottom member, as will be described in more detail later. The bottom member second portion end wall 46 of the second portion of the bottom member may also include a cutout or recess 52 to receive a user's finger and aid in separating the top and bottom members.

Further, the top member 60 includes a first portion 62 selectively coupled to a second portion 80. The top member first portion 62 includes opposed end walls 64 and an outer side wall 66 extending between the opposed end walls 64. The first portion 62 includes a top wall 68, the first portion end walls 64 and side wall 66 extending downwardly from a peripheral edge thereof. The top wall 68 includes a generally planar configuration and an interior edge 69 opposite the outer side wall 66. Accordingly, the top member first portion 62 defines an open bottom and defines an open interior side at the interior edge 69 opposite the first portion outer side wall 66.

Similarly, the top member second portion 80 may include opposed end walls 84 and an outer side wall 86 extending between the opposed end walls 84. The second portion 80 includes a top wall 88, the second portion end walls 84 and side wall 86 extending downwardly from a peripheral edge thereof. The top wall 88 includes an interior edge 89 opposite the outer side wall 86. Accordingly, the top member second portion 80 defines an open bottom and defines an open interior side at the interior edge opposite the second portion outer side wall 86. The top member first portion end walls 64 are selectively and releasably coupled to corresponding top member second portion end walls 84 as will be described in more detail later. The top member second portion outer side wall 86 may also include a cutout or recess 90 to receive a user's finger and aid in separating the top and bottom members.

Figure 1:
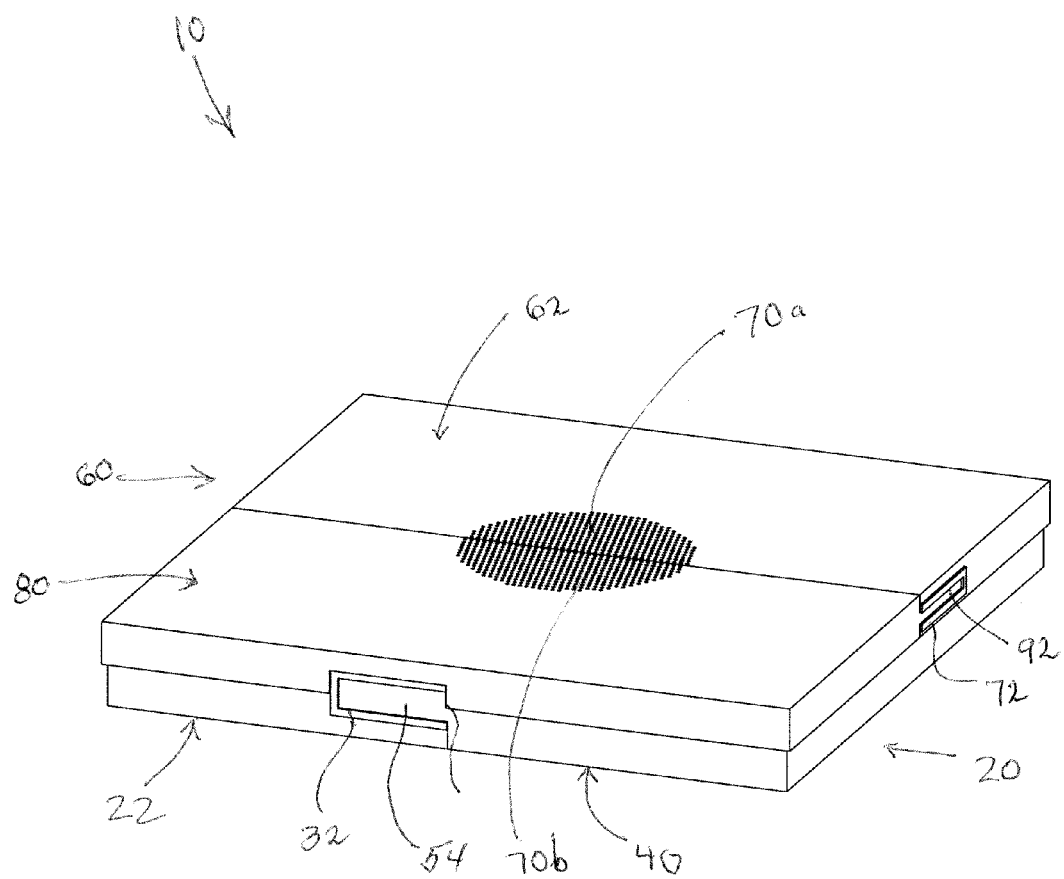
FIG. 1 is a perspective view of a reusable food storage container according to a preferred embodiment of the present invention.

The top member 60 with the top member first portion 62 coupled to the top member second portion 80 includes a circumference, defined by the end walls and side wall of the top member first portion and the top member second portion, slightly larger than a circumference, defined by the end walls and side wall of the bottom member first portion and the bottom member second portion, when the bottom member first portion 22 is coupled to the bottom member second portion 40. Accordingly, the bottom member 20 may be nested in the top member 60 (FIG. 1). In other words, the top member 60 is slightly larger than the bottom member 20 so that the bottom member 20 is nested inside the top member 60.

Each of the side walls 24 of the bottom member first portion 22 defines a channel 32 having an open end 34 in communication with and adjacent the open interior end. In other words each first portion channel open end 34 is in communication with the area outside the respective first portion side wall 24. The first portion channel 32 also includes a closed end 36 inside a respective first portion side wall 24.

Each of the side walls 44 of the bottom member second portion 40 includes a tab 54 having an elongate configuration connected to a free edge thereof and that extends away from the free edge (FIG. 3). Each of the channels 32 is configured to receive a respective tab 54 such that the bottom member of the first portion 22 is securely coupled to a bottom member of the second portion 40 when respective tabs 54 are inserted fully into respective channels 32.

Further, each of the end walls 64 of the top member first portion 62 defines a channel 72 having an open end 74 in communication with and adjacent the open interior side. In other words each top member first portion channel open end 74 is in communication with the area outside a respective top member first portion end wall 64. The first portion channel 72 also includes a closed end 76 inside a respective top member first portion end wall 64.

Each of the end walls 84 of the top member second portion 80 includes an elongate tab 92 connected to a free edge thereof and that extends away from the free edge (FIG. 3). Each of the top member first portion channels 72 is configured to receive a respective second portion tab 92 such that the top member first portion 62 is securely coupled to a the top member second portion 80 when respective tabs 92 are inserted fully into respective channels 72.

The channel 32 of the first portion of the bottom member may include a rail 38 that is configured to slidably receive a respective first portion tab 54 in a smooth, slidable motion. More particularly, the tab 54 is slidably movable between a fully engaged configuration in which a free end of the respective tab 54 is adjacent the channel closed end 36 and a fully released configuration in which the free end of the respective tab 54 is outside the respective channel 32.

Similarly, the top member first portion channel 72 may include a rail 78 that is configured to slidably receive a respective first portion tab 94 in a smooth, slidable motion. More particularly, the top member first portion tab 94 is slidably movable between a fully engaged configuration in which a free end of the respective tab 94 is adjacent the channel closed end 76 and a fully released configuration in which the free end of the respective tab 94 is outside the respective channel 72.

Figure 4B:
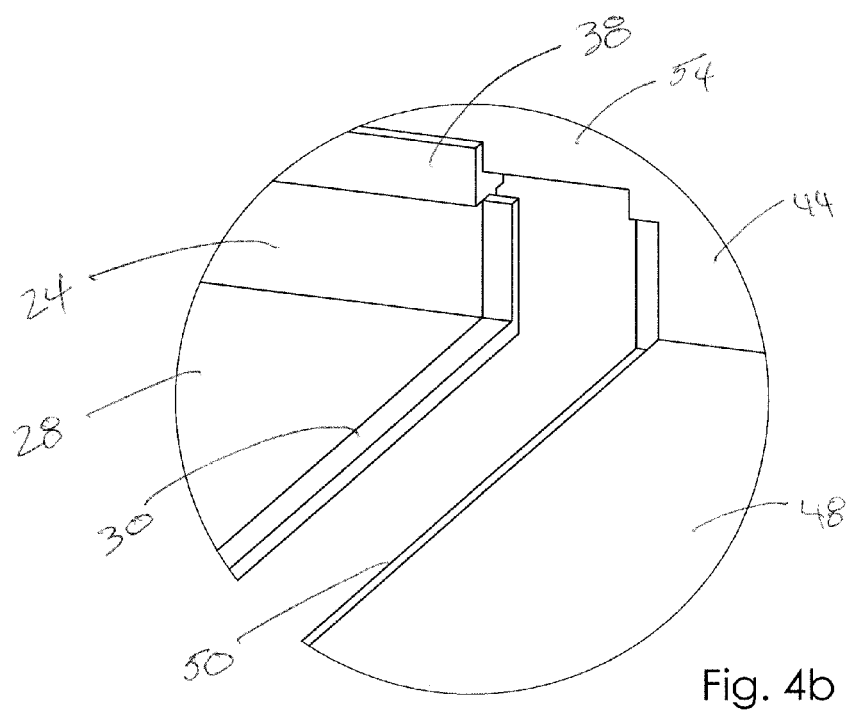
Figure 4A:
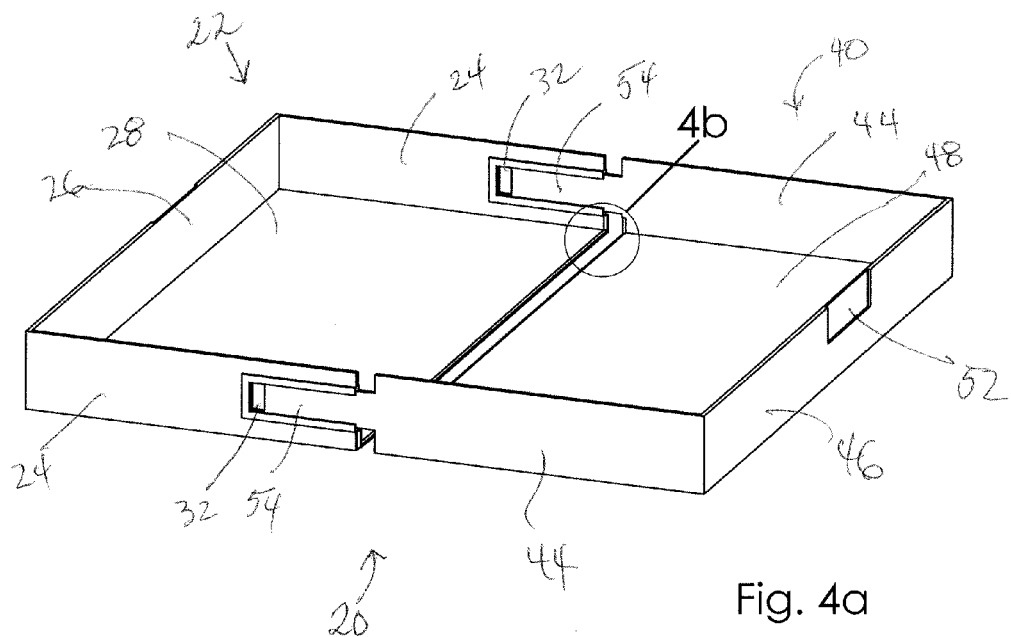
FIG. 4a is perspective view of a bottom member of the food storage container as in FIG. 2.

As shown in FIGS. 4a and 4b, the bottom member 20 further includes a structure that prevents the escape of liquid through the junction of the bottom member first and second portion interior edges 30, 50. More particularly, the interior edge 30 of the bottom member first portion 22 includes a lip. Correspondingly, the interior edge 50 of the bottom member second portion 40 includes a groove. The groove includes a configuration to receive the lip so as to form a moisture barrier when the bottom member first portion is coupled to the bottom member second portion as described above. Free ends of the side walls adjacent the interior edge may also include a lip/groove configuration (FIG. 4b).

The food container 10 also includes at least one vent such that the interior of the container does not build up excessive condensation. More particularly, the top member first portion 62 may include a vent 70a. Alternatively, or in addition, the top member second portion 80 may include another vent 70b. A vent (not shown) may also be situated on one or more side or end walls. It is understood that the vent(s) may include a plurality of perforations although one or more slits or louvers may also be suitable.

Figure 5B:
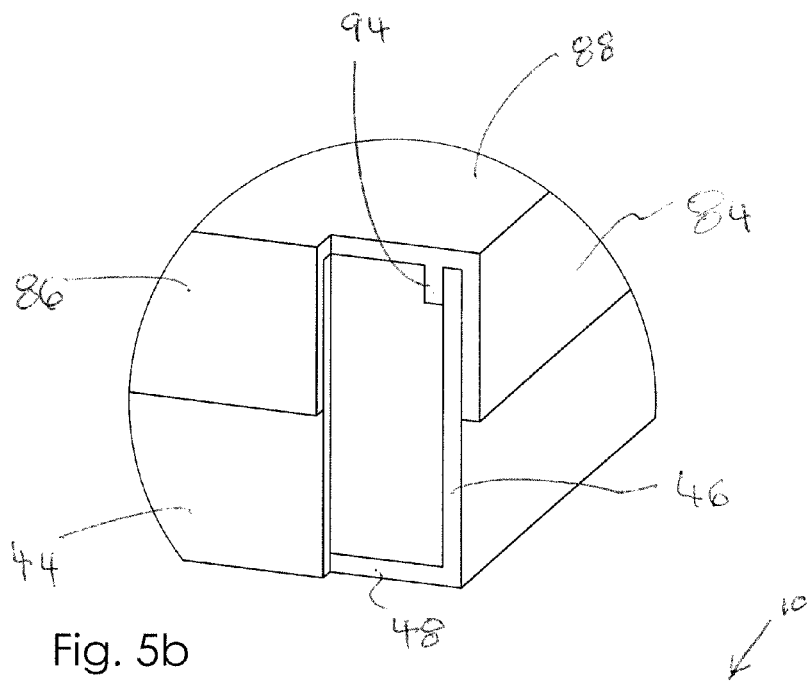
Figure 5A:
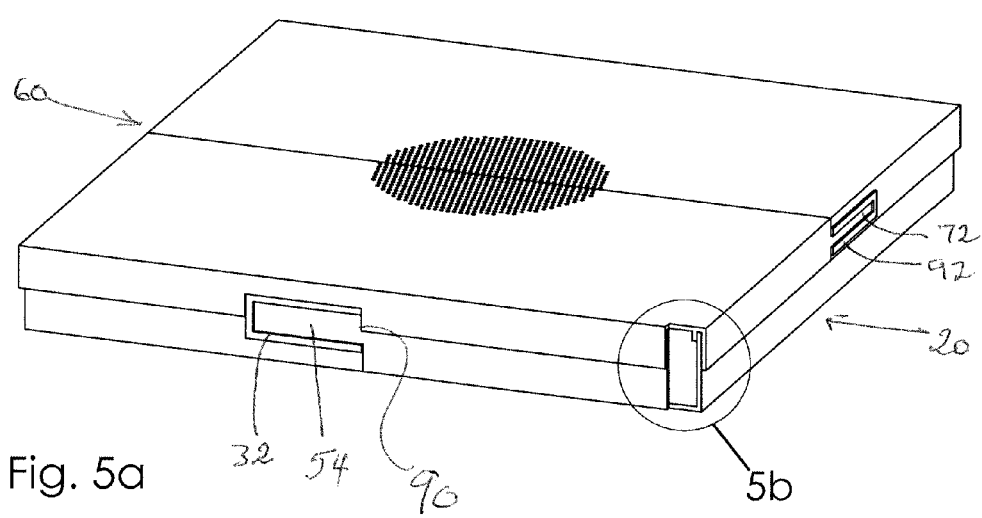
FIG. 5a is a perspective view of the food storage container as in FIG. 1 with a corner thereof fragmented to reveal interior structures.
Figure 1:
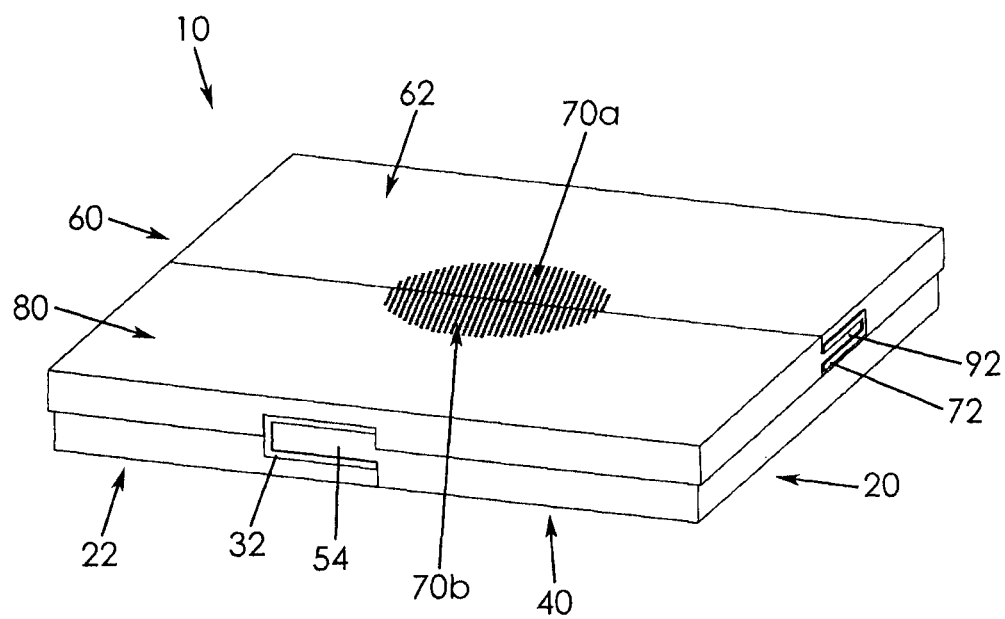
Figure 2:
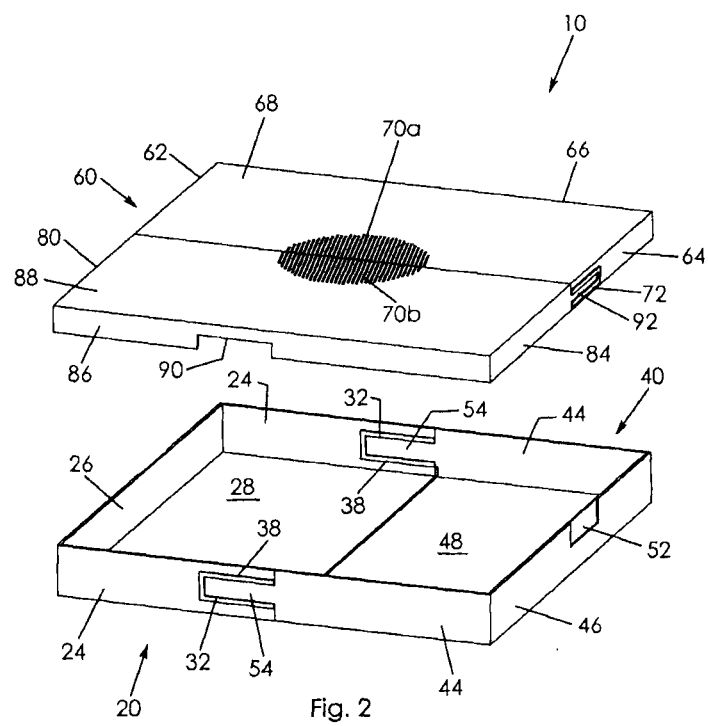
Figure 3:
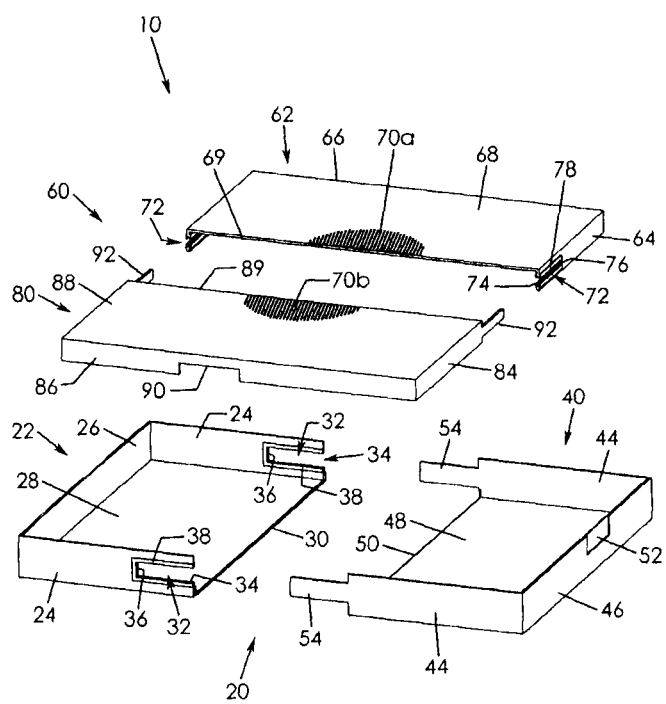
Figure 5B:
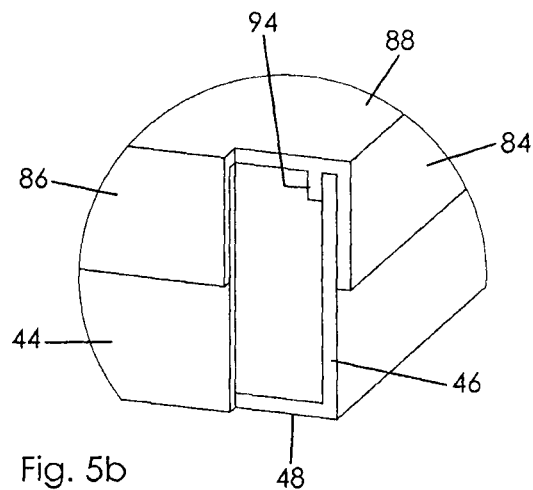
Figure 5A:
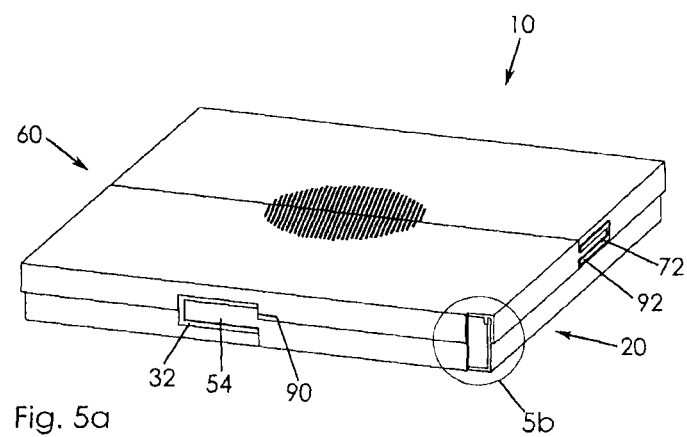

In addition, the top member second portion 80 may include a tab 94 extending downwardly from the second portion top wall 88 (FIGS. 5a and 5b). The tab 94 is slightly displaced from one of the second portion end walls 84 so as to form a slot configured to receive a portion of a bottom member second portion end wall 46 in a friction fit arrangement. Accordingly, the tab 94 provides another means for gently holding the top member 60 to the bottom member 20 but that may be overcome with a light pulling force. It is understood that a tab 94 may be positioned in each corner of the top member first and second portions.

The strength and stability of the present invention is increased by the configuration and orientation of the top member portions relative to the bottom member portions.

Specifically, the tab/channel structures of the bottom member portions are perpendicular to the tab/channel structures of the top member portions as clearly shown in FIG. 3. With this structure, it would be impossible for the bottom member first 22 and second 40 portions to be unintentionally or inadvertently pulled apart in that the top member first 62 and second 80 portions would resist such a movement when the bottom member 20 is nested in the top member 60. Conversely, the top member first 62 and second 80 portions would be prevented from being inadvertently pulled apart in the nested configuration in that the bottom member first 22 and second 40 portions have a perpendicular tab/channel structure relative thereto. Of course, the locking tabs 94 and lip/groove structures described above also contribute to the strength, stability, and integrity of the assembled food storage container 10.

In use, the bottom member first 22 and second 40 portions may be coupled together by aligning and inserting respective tabs 54 into respective channels 32. The lip/groove structures described above may provide a friction fit or even a gentle snap fit arrangement at the fully engaged configuration. Similarly, the top member first 62 and second 80 portions may be fitted together. Food items such as pizza may be situated on the bottom walls of the bottom member and the top member 60 positioned atop the bottom member 20 in a nested relationship. The vent(s) 79a, 79b described above allows the food to "breathe" and inhibits the buildup of excessive condensation inside the food storage container 10. When the food has been removed or consumed, the food storage container 10 may be disassembled for cleaning and storage. Specifically, the top member 60 may be removed and the first 62 and second 80 portions gently pulled apart. Likewise, the first 22 and second 40 portions of the bottom member 20 may be gently pulled apart. The individual portions may then be placed into a dishwasher or sink for cleaning and then conveniently stored in a kitchen cabinet until needed again. It is understood that each of the portions described herein are preferably constructed of a dishwasher suitable plastic material.

It is understood that while certain forms of this invention have been illustrated and described, it is not limited thereto except insofar as such limitations are included in the following claims and allowable functional equivalents thereof.

The invention claimed is:

1. A reusable food container for use in storing pizza, comprising:
   a bottom member having a first portion releasably coupled to a second portion;
   a top member having a first portion releasably coupled to a second portion;
   wherein:
      said bottom member first portion includes opposed bottom member first portion side walls and a bottom member first portion end wall extending between said bottom member first portion side walls;
      said bottom member second portion includes opposed bottom member second portion side walls and a bottom member second portion end wall extending between said second portion side walls;
      said bottom member first portion side walls are releasably coupled to said bottom member second portion side walls, respectively;
      said top member first portion includes opposed top member first portion end walls and a top member first portion outer side wall extending between said top member first portion end walls;
      said top member second portion includes opposed top member second portion end walls and a top member second portion outer side wall extending between said top member second portion end walls;
      said top member first portion end wall is releasably coupled to said top member second portion end wall, respectively;
      said end walls and said side wall of said top member first portion and said top member second portion defines a circumference slightly larger than a circumference defined by said end walls and said side wall of said bottom member first portion and said bottom member second portion, so that said bottom member is selectively nested in said top member.

2. The reusable food container as in claim 1, wherein:
   said bottom member first portion includes a bottom member first portion bottom wall having a planar configuration, said bottom member first portion side walls and said bottom member first portion end wall extend upwardly from a peripheral edge of said bottom member first portion bottom wall;
   said bottom member first portion bottom wall includes a bottom member first portion interior edge;
   said bottom member first portion defines a bottom member first portion open top and a bottom member first portion open interior end adjacent said bottom member first portion interior edge and opposite said bottom member first portion end wall; and
   each of said bottom member first portion side walls defines a bottom member first portion channel having a bottom member first portion channel closed end situated inside a respective bottom member first portion side wall and a bottom member first portion channel open end adjacent said bottom member first portion open interior end.

3. The reusable food container as in claim 2, wherein:
   said bottom member second portion includes a bottom member second portion bottom wall having a planar configuration, said bottom member second portion side walls and said bottom member second portion end wall extend upwardly from a peripheral edge of said bottom member second portion bottom wall;
   said bottom member second portion bottom wall includes a bottom member second portion interior edge;
   said bottom member second portion defining a bottom member second portion open top and a bottom member second portion open interior end adjacent said bottom member second portion interior edge and opposite said bottom member second portion end wall; and
   each of said bottom member second portion side walls includes a bottom member second portion tab connected to a free edge thereof and that extends away therefrom; and
   each of said bottom member first portion channels is configured to receive a respective bottom member second portion tab such that said bottom member first portion is selectively coupled to said bottom member second portion.

4. The reusable food container as in claim 3, wherein each said bottom member first portion channel includes a rail configured to slidably receive a respective bottom member second portion tab such that said respective bottom member second portion tab is selectively movable between a fully engaged configuration in which a free end of said respective bottom member second portion tab is adjacent said bottom member first portion channel closed end and a fully released configuration outside of said respective bottom member first portion channel.

5. The reusable food container as in claim 4, wherein:
said top member first portion includes a top member first portion top wall having a planar configuration, said top member first portion end walls and said top member first portion outer side wall extend downwardly from a peripheral edge of said top member first portion top wall;
said top member first portion top wall includes a top member first portion interior edge;
said top member first portion defines a top member first portion open bottom and a top member first portion open interior side adjacent said top member first portion interior edge and opposite said top member first portion side wall; and
each of said top member first portion end walls defines a top member first portion channel having a top member first portion channel closed end situated inside a respective top member first portion end wall and a top member first portion channel open end adjacent said top member first portion open interior side.

6. The reusable food container as in claim 5, wherein:
said top member second portion includes a top member second portion top wall having a planar configuration, said top member second portion end walls and said top member second portion outer side wall extend downwardly from a peripheral edge of said top member second portion top wall;
said top member second portion top wall includes a top member second portion interior edge;
said top member second portion defines a top member first second open bottom and a top member second portion open interior side adjacent said top member second portion interior edge and opposite said top member second portion side wall;
each of said top member second portion end wall includes a top member second portion tab connected to a free edge thereof and that extends away therefrom; and
each of said top member first portion channels is configured to receive a respective top member second portion tab such that said top member first portion is selectively coupled to said top member second portion.

7. The reusable food container as in claim 6, wherein each said top member first portion channel includes a rail configured to slidably receive a respective top member second portion tab such that said respective top member second portion tab is selectively movable between a fully engaged configuration in which a free end of said respective top member second portion tab is adjacent said top member first portion channel closed end and a fully released configuration in which said free end is outside of said respective top member first portion channel.

8. The reusable food container as in claim 7, wherein said top member first portion includes a vent.

9. The reusable food container as in claim 8, wherein said top member second portion includes a vent.

10. The reusable food container as in claim 7, wherein:
said bottom member first portion channels are perpendicular to said top member first portion channels; and
said bottom member second portion side wall tabs are perpendicular to said top member second portion side wall tabs.

11. The reusable food container as in claim 10, wherein:
said bottom member first portion interior edge is perpendicular to said top member first portion interior edge;
said bottom member second portion interior edge is perpendicular to said top member second portion interior edge;

said bottom member first portion interior edge is adjacent said bottom member second portion interior edge when respective bottom member second portion tabs are at said fully engaged configuration in respective bottom member first portion channels; and
said top member first portion interior edge is adjacent said top member second portion interior edge when respective top member second portion tabs are at said fully engaged configuration in respective top member first portion channels.

12. The reusable food container as in claim 3, wherein:
said interior edge of said bottom member first portion bottom wall includes a lip;
said interior edge of said bottom member second portion bottom wall includes a groove configured to selectively receive said lip so as to form a moisture barrier.

13. The reusable food container as in claim 1, wherein said top member first portion includes a vent.

14. The reusable food container as in claim 1, wherein:
said top member first portion includes a top member first portion top wall having a planar configuration, said top member first portion end walls and said top member first portion outer side wall extend downwardly from a peripheral edge of said top member first portion top wall;
said top member first portion top wall includes a top member first portion interior edge;
said top member first portion defines a top member first portion open bottom and a top member first portion open interior side adjacent said top member first portion interior edge and opposite said top member first portion side wall; and
each of said top member first portion end walls defines a top member first portion channel having a top member first portion channel closed end situated inside a respective top member first portion end wall and a top member first portion channel open end adjacent said top member first portion open interior side.

15. The reusable food container as in claim 14, wherein:
said top member second portion includes a top member second portion top wall having a planar configuration, said top member second portion end walls and said top member second portion outer side wall extend downwardly from a peripheral edge of said top member second portion top wall;
said top member second portion top wall includes a top member second portion interior edge;
said top member second portion defines a top member first second open bottom and a top member second portion open interior side adjacent said top member second portion interior edge and opposite said top member second portion side wall;
each of said top member second portion end wall includes a top member second portion tab connected to a free edge thereof and that extends away therefrom; and
each of said top member first portion channels is configured to receive a respective top member second portion tab such that said top member first portion is selectively coupled to said top member second portion.

16. The reusable food container as in claim 15, wherein each said top member first portion channel includes a rail configured to slidably receive a respective top member second portion tab such that said respective top member second portion tab is selectively movable between a fully engaged configuration in which a free end of said respective top member second portion tab is adjacent said top member first portion channel closed end and a fully released configuration in which said free end is outside of said respective top member first portion channel.

17. The reusable food container as in claim 14, wherein said top member second portion includes a locking tab extending downwardly from said top member second portion top wall that is displaced from one of said top member second portion end walls so as to form a top member second portion slot configured to receive a portion of said bottom member second portion end wall in a friction fit arrangement.

* * * * *

UNITED STATES PATENT AND TRADEMARK OFFICE
CERTIFICATE OF CORRECTION

Page 1 of 6

Figure 2:
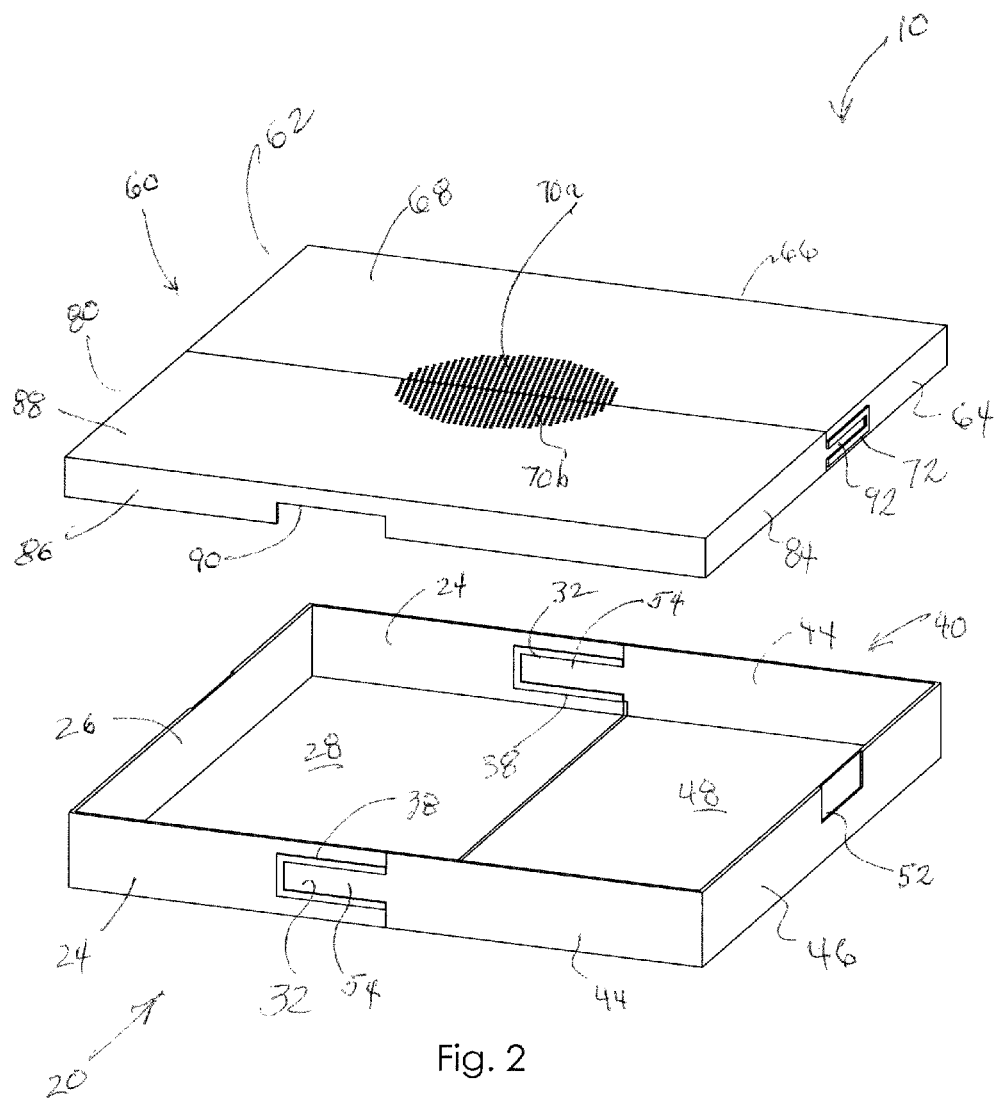
FIG. 2 is a partially exploded view of the food storage container as in FIG. 1.

PATENT NO. : 8,844,739 B2
APPLICATION NO. : 13/335417
DATED : September 30, 2014
INVENTOR(S) : Susan M. Holey and James Farrell It is certified that error appears in the above-identified patent and that said Letters Patent is hereby corrected as shown below:

On the title page, replace the informal drawing with the formal drawing of Fig. 2 and Fig. 3.

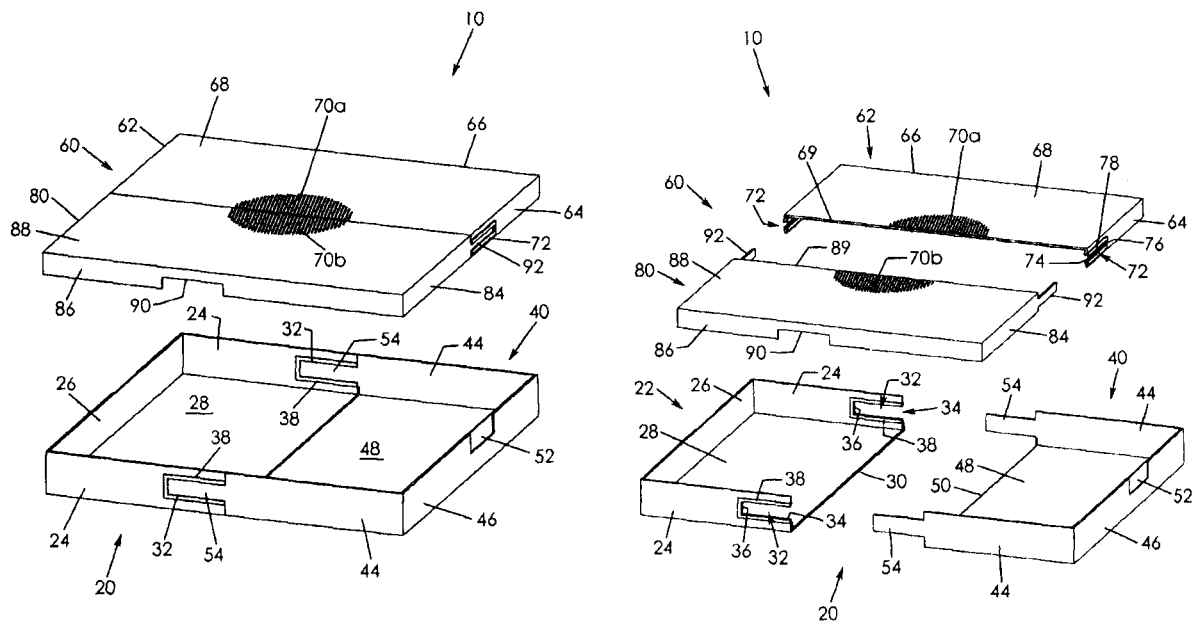

In the Drawings

On drawing Sheet 1 of 5, replace the informal drawing of Fig. 1 with formal drawing of Fig. 1.
On drawing Sheet 2 of 5, replace the informal drawing of Fig. 2 with formal drawing of Fig. 2.
On drawing Sheet 3 of 5, replace the informal drawing of Fig. 3 with formal drawing of Fig. 3.
On drawing Sheet 4 of 5, replace the informal drawing of Fig. 4a & Fig. 4b with formal drawing of Fig. 4a and Fig. 4b.
On drawing Sheet 5 of 5, replace the informal drawing of Fig. 5a & Fig. 5b with formal drawing of Fig. 5a & Fig. 5b.

Signed and Sealed this
Twenty-fourth Day of February, 2015

*Michelle K. Lee*
Michelle K. Lee
*Deputy Director of the United States Patent and Trademark Office*

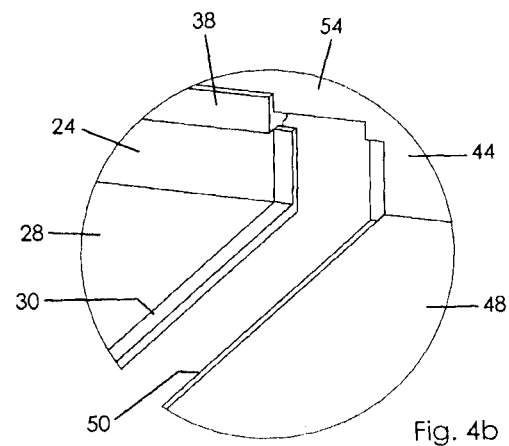
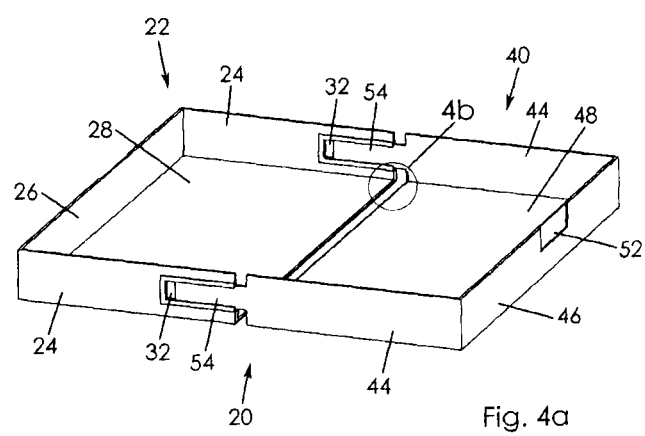
Fig. 4b
Fig. 4a